United States Patent
Fent et al.

(10) Patent No.: US 6,286,538 B1
(45) Date of Patent: Sep. 11, 2001

(54) CHECK VALVE

(75) Inventors: James E. Fent, Owosso, MI (US); James M. Kubik, Avon Lake, OH (US)

(73) Assignee: AlliedSignal Truck Brake Systems Co., Elyria, OH (US)

( * ) Notice: Subject to any disclaimer, the term of this patent is extended or adjusted under 35 U.S.C. 154(b) by 0 days.

(21) Appl. No.: 09/456,034

(22) Filed: Dec. 3, 1999

(51) Int. Cl.$^7$ ............................. F16K 15/02; F16K 11/044
(52) U.S. Cl. ................................. 137/112; 137/113
(58) Field of Search ..................... 137/102, 112, 137/113, 513

(56) References Cited

U.S. PATENT DOCUMENTS

| | | |
|---|---|---|
| 1,791,449 * | 2/1931 | Kennedy . |
| 2,821,972 * | 2/1958 | Banker . |
| 5,437,300 * | 8/1995 | Winnie et al. ..................... 137/112 |

* cited by examiner

Primary Examiner—Stephen M. Hepperle

(57) ABSTRACT

A lightweight, non-metallic valve is preferably formed of molded plastic. The valve has an hour-glass configuration or enlarged recesses formed therein to reduce the overall mass of the assembly and provide increased sensitivity to low flow rates. Sealing O-rings are snap fit into grooves at opposite ends of the symmetrical assembly.

7 Claims, 2 Drawing Sheets

CHECK VALVE

BACKGROUND OF THE INVENTION

1. Field of the Invention

The present application is directed to an air brake system, and is more particularly directed to a double check valve commonly used in an air brake system. It will be appreciated, however, that the invention may be used in related environments and applications that encounter the same types of problems.

2. Discussion of the Art

Presently available check valves use a shuttle as the valve member that is interposed between a pair of inlet or supply passages. The shuttle selectively seals one of the inlets in response to air flow, and more precisely, the pressure differential imposed on the shuttle. The shuttle has a significant mass that includes an enlarged rubber core encased in a metal sleeve with elastomeric sealing ends extending from opposite ends of the sleeve for selective, sealing engagement about the inlet ports of the check valve assembly. In addition, a guide sleeve or tube is typically inserted in the valve body and includes side wall slots to allow air communication through the guide tube. The guide tube assists in selective axial movement of the valve member in response to the flow rate. Thus, the shuttle or double check valve member moves or shuttles between first and second positions depending on whether the pressure or flow rate is higher or lower than the other port. Due to the large mass of the currently used shuttle, the valve is typically mounted in a horizontal orientation for operation. If mounted vertically, a high flow rate is needed to move the shuttle upward and seal the port in the elevated position when air is supplied to the port located in the lower position. Thus, the vertically mounted check valve can encounter less than desirable operation of the valve, i.e., air can be bled from both inlets at low flow rates. Improvements are desired to assure that, in a system where two supplies feed a common delivery, the high pressure supply side will communicate with the delivery port and not communicate or flow into the low pressure supply side.

Moreover, the presently available assembly is relatively expensive because of the materials of construction and labor-intensive assembly features. Thus, in an effort to reduce the weight, as well as minimize the manufacturing cost, improvements are desired.

SUMMARY OF THE INVENTION

The present invention provides a double check valve assembly for an air brake system that is light weight, is less expensive than present arrangements, and is not sensitive to orientation of the valve.

According to the invention, a housing has first and second inlets that communicate with a valve chamber defined therein. A lightweight, non-metallic valve member has elastomeric seals formed at first and second ends for selectively preventing communication between one of the inlets and the outlet.

According to another aspect of the invention, the valve member is a plastic shuttle dimensioned for sliding movement in the valve chamber. The shuttle member has a reduced dimension central portion and enlarged dimensions at opposite ends where the seals selectively engage about the inlet ports.

A primary benefit of the present invention is the increased sensitivity of the valve to low flow and low pressure differential conditions.

Still another benefit of the present invention resides in the decreased sensitivity to mounting orientation of the valve assembly.

Still another benefit garnered from the present invention is the decreased cost.

Still other benefits and advantages of the present invention will become apparent to those skilled in the art upon reading and understanding the following detailed description.

BRIEF DESCRIPTION OF THE DRAWINGS

The invention may take physical form in certain parts and arrangements of parts, a preferred embodiment of which will be described in detail in the specification and illustrated in the accompanying drawings.

DETAILED DESCRIPTION OF THE PREFERRED EMBODIMENT

Figure 1:
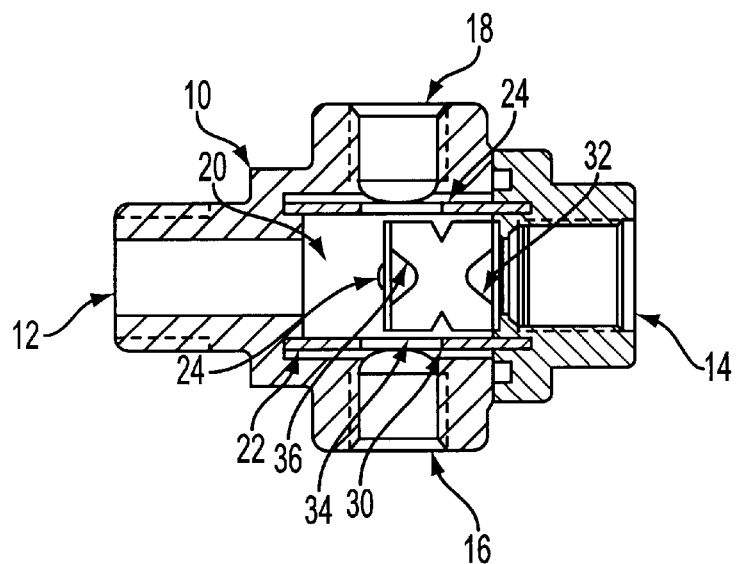
FIG. 1 is a longitudinal cross-sectional view through a conventional double check valve assembly.

Referring now to the drawings, and more particularly to FIG. 1, a brief review and understanding of the current valve structure will illustrate the structural distinctions and advantages offered by the new assembly. The prior art arrangement of FIG. 1 shows a valve housing 10 having first and second inlets 12, 14 disposed on opposite ends of the housing. In addition, one or more outlet or delivery ports 16, 18 are oppositely disposed on the valve housing. The inlets and outlets communicate with a valve chamber 20. As shown, the inlets 12, 14 are preferably longitudinally aligned and, likewise, the outlets 16, 18 are aligned along a lateral axis. Of course other configurations of the inlets and outlets may be used in the prior art but this configuration is conventional.

A guide tube or sleeve 22 includes a series of side wall openings 24 that are circumferentially spaced about the sleeve. The side wall openings allow air communication between the valve chamber and the outlet ports 16, 18. Although the openings 24 are shown aligned with the outlet ports, it will be understood that the valve housing may be suitably dimensioned so that air can communicate around the sleeve and reach the outlet ports irrespective of the particular orientation of the sleeve. As will be appreciated, the sleeve guides axial movement or shuttling of the check valve member 30 between sealing engagement with either port 12 or 14.

A preferred form of construction of the valve shuttle member is a molded rubber member having a metal sleeve or band 34 that extends circumferentially therearound. The sleeve includes a reduced diameter portion 36 in a central region that axially locks the elastomeric member in place. As will be appreciated, a portion of the elastomeric member 32 extends axially from each end of the band 34. This defines an integral sealing surface, for example a raised bead, that provides a circumferentially continuous seal about the inlet ports 12, 14 where the ports interface with the valve chamber. Prior attempts to reduce some of the mass included recesses 36 in the elastomeric members. In the conventional embodiment shown in FIG. 1, the recesses extend axially inward from each end of the valve member. In response to differential pressure or flow through the inlets 12, 14, the shuttle is urged to the low pressure or low flow inlet and seals thereabout. This establishes communication between one of the supply inlets and the delivery port(s).

Figure 2:
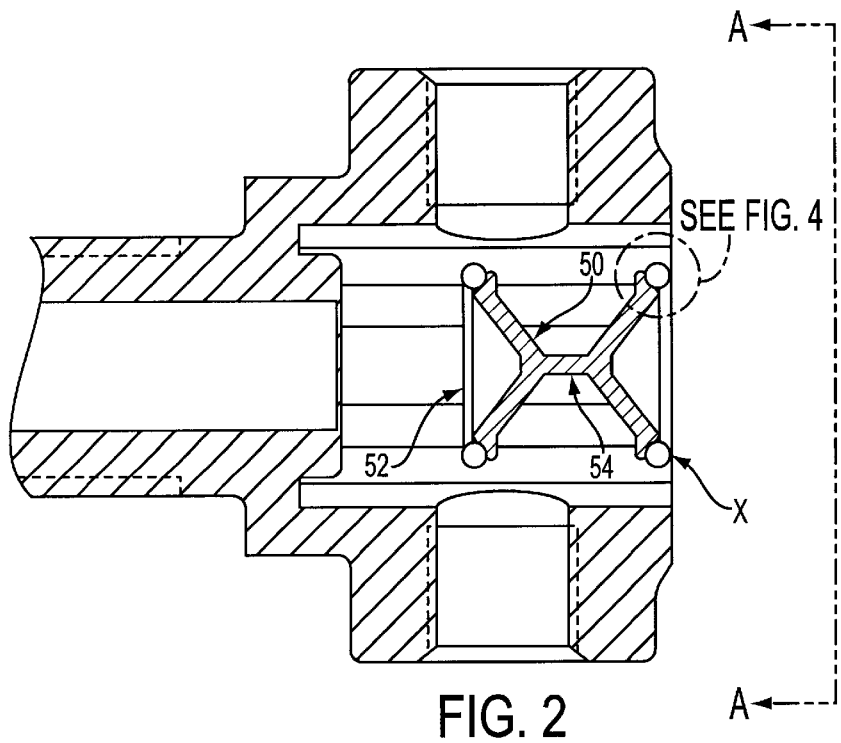
FIG. 2 is a longitudinal cross-sectional view through a preferred embodiment of the present invention.

FIG. 2 illustrates a preferred embodiment of the valve assembly of the present invention. It includes a one-piece body 50 that has a generally hour-glass shaped configuration. That is, enlarged recesses 52 extend axially inwardly at each end of the valve member. As shown, the recesses have a generally frusto-conical shape. In addition, the valve member includes recess 54 which is a circumferentially continuous. As evident in FIG. 2, the recesses are such that the wall thickness of the valve member is generally constant. As will be appreciated, incorporating the enlarged recesses 52, 54 into the valve body substantially reduces mass and weight of the overall assembly, without sacrificing strength and durability of the valve member.

Figure 3:
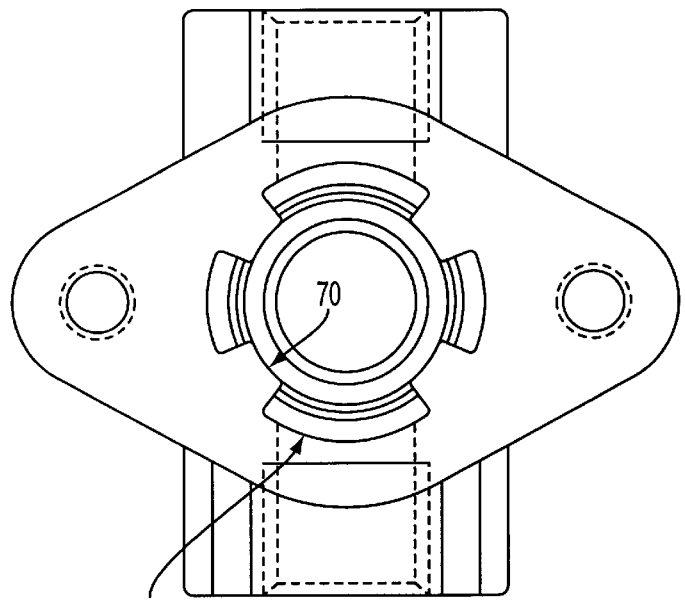
FIG. 3 is an end view of the valve housing of FIG. 2 illustrating integrally formed guide ribs.

With continued reference to FIG. 2, and additional reference to FIG. 3, grooves 60 are provided at the end faces and circumferentially outer region of the valve member. The grooves 60 are dimensioned to frictionally receive seal members such as O-ring 62 therein. It will also be appreciated that the valve member 50 is preferably symmetrical about the y-axis. In this manner, there is less chance for error during assembly when the valve shuttle is inserted into the chamber, i.e., either end of the valve member can be initially inserted into the chamber without adversely effecting operation of the valve.

FIG. 3 is an end view of the valve housing and illustrates how integrally formed ribs 70 may extend radially inward from the housing into the valve chamber 72. The ribs are circumferentially spaced about the chamber and may be integrally cast, for example, with the housing. A machining operation provides for generally planar surfaces of the ribs so that the shuttle member can smoothly shuttle or axially move between the inlets in response to differential pressure/ air flow.

Figure 4:
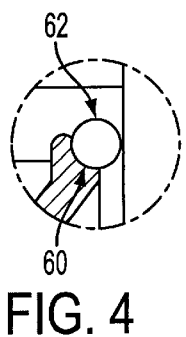
FIG. 4 is an enlarged view of one end of the valve member of FIG. 2 illustrating receipt of a seal member therein.

The valve member is preferably molded from a plastic material such as a glass-filled acetal. This material is desirable because of its ability to withstand degradation in response to contaminants in association with an air pressure braking system. At the same time, The acetal material is easily molded into a wide range of shapes. Further, the constant wall thickness promotes even cooling and eliminates problems associated with shrinkage and porosity. The hour-glass shape and the enlarged recesses remove a substantial portion of the mass so that the assembly is extremely lightweight (compare FIGS. 1 and 2). More importantly, the assembly has greater sensitivity to low flow rates. Where the arrangement of FIG. 1 required a flow rate on the order of two and one-half standard cubic feet per minute (2.5 scfm) flow rate to assure a closed position, the assembly of FIGS. 2–4 exhibits an approximately five fold improvement, i.e., an approximate flow rate on the order of one-half standard cubic feet per minute (0.5 scfm).

The invention has been described with reference to the preferred embodiments. Obviously, modifications and alterations will occur to others upon a reading and understanding of the present specification. The invention is intended to include all such modifications and alterations insofar as they fall within the scope of the appended claims and the equivalents thereof.

Having thus described the invention, it is now claimed:

1. In a heavy duty vehicle, air brakes system, a valve assembly comprising:

a housing having first and second inlets and an outlet communicating with a valve chamber defined therein; and a lightweight, non-metallic valve member dimensioned for receipt in the valve chamber, the valve member having elastomeric seals located at first and second ends thereof for selectively preventing communication with one of the first and second inlets in response to a higher differential pressure at the other of the first and second inlet, the valve member further having frustoconical-shaped recesses extending axially inward from each of said first and second ends and a circumferentially continuous recess extending radially inward such that valve member has a generally constant wall thickness.

2. The assembly of claim 1 wherein the non-metallic valve member is formed from plastic.

3. The assembly of claim 2 wherein the elastomeric seals at the first and second ends of the valve member are received in grooves in the plastic.

4. The assembly of claim 1 wherein the elastomeric seal at the first and second ends of the valve member are integrally formed therein.

5. The assembly of claim 1 wherein the valve housing is oriented substantially vertically so that the first inlet is located above the second inlet so that the lightweight, non-metallic valve member is substantially unaffected by gravity and sealingly engages the first inlet when pressure is only slightly higher at the second inlet than the first inlet.

6. A three-way valve for an air brake system comprising:

a valve housing having a first inlet communicating with an upstream first source of air pressure and a second inlet communicating with an upstream, second source of air pressure, and an outlet selectively communicating with only one of the first and second inlets which is at a higher air pressure than the other of the first and second inlets; and a plastic shuttle member received in the housing and dimensioned for sliding movement between the first and second inlets to selectively seal the first inlet when the air pressure is higher at the second inlet, and seal the second inlet when the air pressure is higher at the first inlet, said shuttle member comprising first and second seal members disposed on first and second ends of the shuttle member, said shuttle member also including recesses extending axially inward from each of said first and second ends and a circumferentially continuous recess extending radially inward, said recesses being dimensioned such that the shuttle member has a substantially constant cross-sectional wall thickness over its axial length.

7. The valve of claim 6 further comprising a first O-ring received in a groove at a first end and a second O-ring received in a groove at a second end.

* * * * *